(12) United States Patent
Narita

(10) Patent No.: US 11,072,759 B2
(45) Date of Patent: Jul. 27, 2021

(54) LUBRICATING OIL COMPOSITION, LUBRICATION METHOD, AND TRANSMISSION

(71) Applicant: IDEMITSU KOSAN CO., LTD., Chiyoda-ku (JP)

(72) Inventor: Keiichi Narita, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 16/079,941

(22) PCT Filed: Feb. 28, 2017

(86) PCT No.: PCT/JP2017/007703
§ 371 (c)(1),
(2) Date: Aug. 24, 2018

(87) PCT Pub. No.: WO2017/150507
PCT Pub. Date: Sep. 8, 2017

(65) Prior Publication Data
US 2019/0024016 A1    Jan. 24, 2019

(30) Foreign Application Priority Data

Feb. 29, 2016 (JP) .............................. JP2016-037191

(51) Int. Cl.
| | | |
|---|---|---|
| *C10M 169/04* | (2006.01) | |
| *F16C 33/10* | (2006.01) | |
| *F16H 57/04* | (2010.01) | |
| *F16C 33/66* | (2006.01) | |
| *C10N 20/00* | (2006.01) | |
| *C10N 20/02* | (2006.01) | |
| *C10N 30/00* | (2006.01) | |
| *C10N 30/02* | (2006.01) | |
| *C10N 30/06* | (2006.01) | |
| *C10N 30/08* | (2006.01) | |
| *C10N 40/04* | (2006.01) | |
| *C10N 40/14* | (2006.01) | |
| *C10N 40/25* | (2006.01) | |

(52) U.S. Cl.
CPC ...... *C10M 169/045* (2013.01); *C10M 169/04* (2013.01); *C10M 2203/1006* (2013.01); *C10M 2203/1025* (2013.01); *C10M 2205/02* (2013.01); *C10M 2207/282* (2013.01); *C10M 2207/283* (2013.01); *C10M 2207/289* (2013.01); *C10M 2207/2825* (2013.01); *C10M 2207/2835* (2013.01); *C10M 2209/084* (2013.01); *C10M 2215/08* (2013.01); *C10M 2290/02* (2013.01); *C10M 2290/04* (2013.01); *C10N 2020/00* (2013.01); *C10N 2020/02* (2013.01); *C10N 2030/00* (2013.01); *C10N 2030/02* (2013.01); *C10N 2030/06* (2013.01); *C10N 2030/08* (2013.01); *C10N 2030/54* (2020.05); *C10N 2030/76* (2020.05); *C10N 2040/04* (2013.01); *C10N 2040/042* (2020.05); *C10N 2040/044* (2020.05); *C10N 2040/045* (2020.05); *C10N 2040/14* (2013.01); *C10N 2040/25* (2013.01); *F16C 33/10* (2013.01); *F16C 33/66* (2013.01); *F16H 57/04* (2013.01); *Y02T 10/62* (2013.01)

(58) Field of Classification Search
CPC ........ C10M 2215/08; C10M 2207/283; C10M 2290/02; C10M 2290/04; C10N 2230/02; C10N 2230/76; C10N 2230/08; C10N 2230/06; C10N 2240/042; C10N 2040/42; C10N 2040/04; C10N 2030/02
See application file for complete search history.

(56) References Cited

U.S. PATENT DOCUMENTS

| | | | |
|---|---|---|---|
| 6,187,979 B1 * | 2/2001 | Ido | ....................... C10M 169/04 585/10 |
| 2004/0209786 A1 | 10/2004 | Sagawa et al. | |
| 2009/0149360 A1 | 6/2009 | Zakarian | |
| 2010/0009876 A1 | 1/2010 | Kamano et al. | |
| 2010/0144567 A1 * | 6/2010 | Ito | ....................... C10M 141/12 508/192 |

(Continued)

FOREIGN PATENT DOCUMENTS

| | | |
|---|---|---|
| CN | 102395661 A | 3/2012 |
| CN | 105051171 A | 11/2015 |

(Continued)

OTHER PUBLICATIONS

Japanese Office Action dated May 7, 2019 in Patent Application No. 2016-037191, 10 pages (with unedited computer generated English translation).

(Continued)

*Primary Examiner* — Vishal V Vasisth

(74) *Attorney, Agent, or Firm* — Oblon, McClelland, Maier & Neustadt, L.L.P.

(57) ABSTRACT

Provided are: a lubricating oil composition containing a mineral oil (A) having a kinematic viscosity at 40° C. of 5 to 15 mm$^2$/s and a flash point of 180° C. or higher, a synthetic oil (B) having a kinematic viscosity at 40° C. of 5 to 15 mm$^2$/s and a flash point of 190° C. or higher, an amide compound (C) and a polyol ester compound (D), which has a low viscosity and fuel saving performance, which can be used in high-temperature environments, and which has excellent gear anti-seizing property and anti-shudder performance; and a lubrication method and a transmission using the lubricating oil composition.

11 Claims, No Drawings

(56) References Cited

U.S. PATENT DOCUMENTS

| | | | |
|---|---|---|---|
| 2015/0184107 A1* | 7/2015 | Sakanoue | C10M 137/105 508/370 |
| 2016/0075964 A1 | 3/2016 | Komatsubara | |
| 2016/0340603 A1 | 11/2016 | Takahashi et al. | |

FOREIGN PATENT DOCUMENTS

| | | |
|---|---|---|
| EP | 2 261 309 A1 | 12/2010 |
| EP | 2 960 321 A1 | 12/2015 |
| GB | 915161 A | 1/1963 |
| JP | 6-145683 A | 5/1994 |
| JP | 2003-082375 A | 3/2003 |
| JP | 2008-106167 A | 5/2008 |
| JP | 2009-249496 A | 10/2009 |
| JP | 5654788 | 1/2012 |
| JP | 2014-169460 | 9/2014 |
| WO | WO 92/02602 A1 | 2/1992 |
| WO | WO 02/097017 A1 | 12/2002 |
| WO | WO 2008/047550 A1 | 4/2008 |
| WO | WO 2010/079743 A1 | 7/2010 |
| WO | WO 2014/010697 A1 | 1/2014 |
| WO | WO 2015/107752 A1 | 7/2015 |
| WO | WO 2016/157958 A1 | 10/2016 |
| WO | WO 2016/157960 A1 | 10/2016 |

OTHER PUBLICATIONS

International Search Report dated Apr. 18, 2017, in PCT/JP2017/007703 filed Feb. 28, 2017.
Search Report dated Sep. 30, 2019 in Patent Application No. 17759973.5, 6 pages.
Office Action dated Dec. 17, 2019, in Japanese Patent Application No. 2016-037191, filed Feb. 29, 2016, (with English Translation).
Japanese Office Action dated Jun. 23, 2020 in Patent Application No. 2016-037191 (with English translation), 11 pages.
Office Action dated Nov. 17, 2020, in Japanese Patent Application No. 2016-37191 w/English translation.
Office Action dated Feb. 9, 2021, in Chinese Patent Application No. 201780013633.8.
Office Action dated Oct. 26, 2020 in European Patent Application No. 17759973.5.
Phillips 66, "Sales Specification of Ultra-S Base Oils", Internet Citation, May 27, 2003, p. 1, XP-002727951.

* cited by examiner

LUBRICATING OIL COMPOSITION, LUBRICATION METHOD, AND TRANSMISSION

CROSS-REFERENCE TO RELATED APPLICATIONS

This application is a National Stage of PCT/JP2017/007,703, which was filed on Feb. 28, 2017. This application is based upon and claims the benefit of priority to Japanese Application No. 2016-037,191, which was filed on Feb. 29, 2016.

TECHNICAL FIELD

The present invention relates to a lubricating oil composition, and to a lubrication method and a transmission using the lubricating oil composition.

BACKGROUND ART

Recently, with the increase in the consciousness of environmental issues, requirements for fuel saving in various technical fields are being severer, for the purpose of more effective use of oil resources and reduction in $CO_2$ emission. For example, for lubricating oil compositions for use in transmissions, requirements for fuel saving are increasing.

For example, PTL 1 describes a lubricating oil composition that contains at least one of mineral oils and poly-α-olefins having predetermined properties, at least one of other mineral oils and poly-α-olefins, and a polymethacrylate and the like. PTL 2 describes a lubricating oil composition that contains a mineral oil-based base oil having predetermined properties, a monoester-based base oil, a phosphite, and a boronated ash-free dispersant.

CITATION LIST

Patent Literature

PTL 1: JP 2011-168677 A
PTL 2: JP 2014-159496 A

DISCLOSURE OF INVENTION

Technical Problem

Among transmissions, those for automobiles are equipped with a torque converter, a wet clutch, a gear bearing assembly, a hydraulic control system, etc., and by reducing the viscosity of the lubricating oil composition to be used in these, stirring resistance and frictional resistance can be reduced therefore improving power transmission efficiency and resulting in fuel saving. In that manner, reducing the viscosity of the lubricating oil composition for use in transmissions is an effective means for attaining fuel saving.

On the other hand, with reducing the viscosity of a lubricating oil composition, a sufficient oily film could hardly be formed on the surfaces of metal parts therefore often causing metal-to-metal contact to provide, as the case may be, some transmission failures owing to gear seizing. In addition, viscosity reduction may cause flash point depression, and, for example, in the case where transmissions are mounted on electric vehicles or hybrid vehicles, there may occur some trouble in use in high-temperature environments.

A torque converter transmits power while absorbing the differential rotation through stirring of a lubricating oil composition, and in any other than starting, the torque converter directly transmits power via a rock-up clutch to reduce energy loss for attaining fuel saving. For rock-up clutch control, direct fastening may be combined with slip control for power transmission with slipping, and in such a case where the frictional properties of a lubricating oil composition are unsuitable, there may occur self-excited vibration called shudder. Accordingly, by improving the anti-shudder performance of a lubricating oil composition, more accurate rock-up clutch control may become possible to realize fuel saving. However, the anti-shudder performance is a property that could not be attained by mere reduction in the viscosity of a lubricating oil composition.

The kinematic viscosity at 100° C. of the lubricating oil composition described in PTL 1 is 5.5 $mm^2/s$ or more and 6.5 $mm^2/s$ or less, and it could not be said that the viscosity of the composition is sufficiently low, and therefore, as the case may be, there may occur a problem that the composition could not sufficiently satisfy the severer requirements for fuel saving performance. The kinematic viscosity at 100° C. of the lubricating oil composition described in PTL 2 is 2.5 to 4.0 $mm^2/s$, and is sufficiently low, but at the same time, the composition could not satisfy the anti-shudder performance for rock-up crutch.

The present invention has been made in consideration of the above-mentioned situations, and its objects are to provide a lubricating oil composition having a low viscosity and fuel saving performance, being excellent in gear anti-seizing property and usability in high-temperature environments, and being excellent in anti-shudder performance, and to provide a lubrication method and a transmission using the lubricating oil composition.

Solution to Problem

As a result of assiduous studies, the present inventors have found that the present invention mentioned below can solve the above-mentioned problems. Specifically, the present invention provides a lubricating oil composition having the constitution mentioned below, and a lubrication method and a transmission using the lubricating oil composition.

1. A lubricating oil composition containing a mineral oil (A) having a kinematic viscosity at 40° C. of 5 to 15 $mm^2/s$ and a flash point of 180° C. or higher, a synthetic oil (B) having a kinematic viscosity at 40° C. of 5 to 15 $mm^2/s$ and a flash point of 190° C. or higher, an amide compound (C) and a polyol ester compound (D).
2. A lubrication method using the lubricating oil composition of the above 1.
3. A transmission using the lubricating oil composition of the above 1.

Advantageous Effects of Invention

According to the present invention, there can be provided a lubricating oil composition having a low viscosity and fuel saving performance, being excellent in gear anti-seizing property and usability in high-temperature environments, and being excellent in anti-shudder performance, and a lubrication method and a transmission using the lubricating oil composition.

DESCRIPTION OF EMBODIMENTS

Hereinunder, embodiments of the present invention (also referred to as the present embodiments) are described. In this description, the terminology "X to Y" regarding the description of numerals indicates the minimum value X or more and the maximum value Y or less, and the minimum values and the maximum values thus expressed may be combined arbitrarily.

[Lubricating Oil Composition]

The lubricating oil composition for transmissions of the present embodiment contains a mineral oil (A) having a kinematic viscosity at 40° C. of 5 to 15 mm$^2$/s and a flash point of 180° C. or higher (hereinafter may be simply referred to as a mineral oil (A)), a synthetic oil (B) having a kinematic viscosity at 40° C. of 5 to 15 mm$^2$/s and a flash point of 190° C. or higher (hereinafter may be simply referred to as a synthetic oil (B)), an amide compound (C) and a polyol ester compound (D).

<Mineral Oil (A)>

The mineral oil (A) is required to be a mineral oil characterized by having a kinematic viscosity at 40° C. of 5 to 15 mm$^2$/s and a flash point of 180° C. or higher. When the mineral oil (A) does not have the kinematic viscosity at 40° C. and the flash point as mentioned above, a lubricating oil composition simultaneously satisfying all the requirements of fuel saving performance, gear anti-seizing property, usefulness in high-temperature environments and anti-shudder performance could not be obtained.

Especially from the viewpoint of fuel saving performance, the kinematic viscosity at 40° C. of the mineral oil (A) is preferably 7 to 13 mm$^2$/s, more preferably 8 to 12 mm$^2$/s, even more preferably 8.5 to 11 mm$^2$/s. From the same viewpoint, the kinematic viscosity at 100° C. of the mineral oil (A) is preferably 2 to 5 mm$^2$/s, more preferably 2 to 4 mm$^2$/s, even more preferably 2 to 3 mm$^2$/s. In addition, the viscosity index thereof is preferably 90 or more, more preferably 100 or more, even more preferably 110 or more.

In this description, the kinematic viscosity and the viscosity index are values measured using a glass capillary viscometer according to JIS K 2283:2000.

In addition, especially from the viewpoint of usefulness in high-temperature environments, the flash point of the mineral oil (A) is preferably 182° C. or higher, more preferably 186° C. or higher. In this description, the flash point is a value measured in a COC method according to JIS K 2265-4:2007.

With no specific limitation, the mineral oil (A) may be any one having the above-mentioned kinematic viscosity at 40° C. and flash point, and examples thereof include a paraffin-based mineral oil, a naphthene-based mineral oil, and an intermediate-based mineral oil. More specifically, examples of these mineral oils include topped crudes obtained through atmospheric distillation of paraffin-based, naphthene-based or intermediate-based crude oils, etc.; distillates obtained through reduced-pressure distillation of such topped crudes; mineral oils obtained by purifying the distillates through one or more treatments among solvent deasphalting, solvent extraction, hydrocracking, solvent dewaxing, catalytic dewaxing, hydrorefining and the like; and mineral oils obtained by isomerizing a wax produced through Fischer-Tropsch synthesis (GTL wax). For the mineral oil (A), one of the above-mentioned various mineral oils may be used singly, or plural kinds thereof may be used in combination.

The mineral oil may be those grouped in any of Groups 1, 2 and 3 in the base oil category by API (American Petroleum Institute), but is preferably those grouped in Groups 2 and 3.

The content of the mineral oil (A) based on the total amount of the composition is preferably 50 to 97% by mass, more preferably 55 to 95% by mass, even more preferably 60 to 90% by mass. When the content of the mineral oil (A) falls within the above range, all the requirements of fuel saving performance, gear anti-seizing property, and usefulness and anti-shudder performance in high-temperature environments can be readily satisfied simultaneously.

<Synthetic Oil (B)>

The synthetic oil (B) is required to be a synthetic oil characterized by having a kinematic viscosity at 40° C. of 5 to 15 mm$^2$/s and a flash point of 190° C. or higher. When the synthetic oil (B) does not have the kinematic viscosity at 40° C. and the flash point as mentioned above, a lubricating oil composition simultaneously satisfying all the requirements of fuel saving performance, gear anti-seizing property, usefulness in high-temperature environments and anti-shudder performance could not be obtained.

Especially from the viewpoint of fuel saving performance and gear anti-seizing property, the kinematic viscosity at 40° C. of the synthetic oil (B) is preferably 5 to 13 mm$^2$/s, more preferably 5.5 to 11 mm$^2$/s, even more preferably 6 to 10 mm$^2$/s. From the same viewpoint, the kinematic viscosity at 100° C. of the synthetic oil (B) is preferably 1 to 5 mm$^2$/s, more preferably 1.5 to 4.5 mm$^2$/s, even more preferably 2 to 4 mm$^2$/s. In addition, the viscosity index thereof is preferably 120 or more, more preferably 140 or more, even more preferably 160 or more.

In addition, especially from the viewpoint of usefulness in high-temperature environments, the flash point of the synthetic oil (B) is preferably 195° C. or higher, more preferably 200° C. or higher.

With no specific limitation, the synthetic oil (B) may be any one having the above-mentioned kinematic viscosity at 40° C. and flash point, and examples thereof include poly-α-olefins such as polybutene, ethylene-α-olefin copolymers, and α-olefin homopolymers or copolymers; hydrocarbon oils such as paraffin oil; various ester oils such as polyol esters, dibasic acid esters, and phosphate esters; various ether oils such as polyvinyl ethers, polyphenyl ethers, and polyoxyalkylene glycols (PAG); aromatic oils such as alkylbenzenes and alkylnaphthalenes; and polyglycols. For the synthetic oil, one of the above-mentioned various synthetic oils may be used singly, or plural kinds thereof may be used in combination.

The content of the synthetic oil (B) based on the total amount of the composition is preferably 3 to 50% by mass, more preferably 5 to 45% by mass, even more preferably 8 to 30% by mass, and especially preferably 10 to 25% by mass. When the content of the synthetic oil (B) falls within the above range, all the requirements of fuel saving performance, gear anti-seizing property, usefulness in high-temperature environments and anti-shudder performance can be readily satisfied simultaneously.

<Amide Compound (C)>

The lubricating oil composition of the present embodiment contains an amide compound (C). Not containing an amide compound (C), a lubricating composition simultaneously satisfying all the requirements of fuel saving performance, gear anti-seizing property, usefulness in high-temperature environments and anti-shudder performance could not be obtained.

With no specific limitation, the amide compound (C) may be any compound having an amide bond (C(=O)—N) in the molecule, and examples thereof include a reaction product of an amine compound and a carboxylic acid compound.

For example, the amine compound is preferably an aliphatic polyamine having 4 to 30 carbon atoms, preferably 5 to 24 carbon atoms, more preferably 6 to 20 carbon atoms, even more preferably 6 to 12 carbon atoms. The number of the nitrogen atoms in the amine compound (derived from —NH— group, —NH$_2$ group) is preferably 2 to 16, more preferably 2 to 12, even more preferably 3 to 8.

Examples of such aliphatic polyamines include alkylenediamines such as hexamethylenediamine, diaminoheptane, diaminooctane, diaminononane, diaminodecane, diaminoundecane, diaminododecane, diaminotridecane, diaminotetradecane, diaminopentadecane, diaminohexadecane, diaminoheptadecane, diaminooctadecane, diaminononadecane, diaminoeicosane, diaminoheneicosane, diaminodocosane, diaminotricosane, diaminotetracosane, diaminopentacosane, diaminohexacosane, diaminoheptacosane, diaminooctacosane, diaminononacosane, and diaminotriacontane; alkenylenediamines such as hexenyldiamine, heptenyldiamine, octenyldiamine, nonenyldiamine, decenyldiamine, undecenyldiamine, dodecenyldiamine, tridecenyldiamine, tetradecenyldiamine, pentadecenyldiamine, hexadecenyldiamine, heptadecenyldiamine, octadecenyldiamine, nonadecenyldiamine, eicosenyldiamine, heneicosenyldiamine, docosenyldiamine, tricosenyldiamine, tetracosenyldiamine, pentacosenyldiamine, hexacosenyldiamine, heptacosenyldiamine, octacosenyldiamine, nonacosenyldiamine, and triacontenyldiamine; and polyalkylenepolyamines such as diethylenetriamine, dipropylenetriamine, di(methylethylene)triamine, dibutylenetriamine, tripropylenetriamine, tris(2-aminoethyl)amine, triethylenetetramine, tripropylenetetramine, tributylenetetramine, tetraethylenepentamine, tetrapropylenepentamine, pentaethylenehexamine, pentapropylenehexamine, pentapentylenehexamine, hexaethyleneheptamine, heptaethyleneoctamine, octaethylenenonamine, and nonaethylenedecamine.

Among these, alkylenediamines and polyalkylenepolyamines are preferred; polyalkylenepolyamines are more preferred; polyalkylenepolyamines in which the alkylene is an alkylene having 2 to 4 carbon atoms are even more preferred; and polyethylenepolyamines in which the alkylene is an alkylene having 2 carbon atoms and in which the total carbon number is 6 to 12 are especially preferred.

In the polyalkylenepolyamines, the repeating unit (—NH—(CH$_2$)$_n$—, in which n indicates an integer of 1 or more) part may be linear, branched or cyclic, but is preferably linear.

The carboxylic acid compound is preferably a carboxylic acid having, for example, 6 to 30 carbon atoms, preferably 8 to 24 carbon atoms, more preferably 12 to 24 carbon atoms, even more preferably 16 to 20 carbon atoms. The carboxylic acid compound may have a linear or branched configuration, and may be any of a saturated or unsaturated one.

Typically, examples of such carboxylic acid compounds include saturated monocarboxylic acids such as caproic acid, enanthic acid, caprylic acid, 2-ethylhexanoic acid, pelargonic acid, capric acid, lauric acid, tridecanoic acid, myristic acid, palmitic acid, margaric acid, stearic acid, isostearic acid, arachidic acid, behenic acid, and lignoceric acid; and unsaturated monocarboxylic acids such as myristoleic acid, palmitoleic acid, sapienic acid, oleic acid, linolic acid, linoleic acid, gadoleic acid, eicosenic acid, eicosadienic acid, erucic acid, and docosadienic acid.

From the viewpoint of obtaining especially excellent gear anti-seizing property, the carboxylic acid compound is preferably a saturated carboxylic acid, and more preferably a saturated carboxylic acid having 16 to 20 carbon atoms. More specifically, stearic acid, isostearic acid, oleic acid, linolic acid and linoleic acid are more preferred, and stearic acid, isostearic acid and oleic acid are even more preferred.

The content of the amide compound (C) based on the total amount of the composition is preferably 0.001 to 0.5% by mass, more preferably 0.005 to 0.3% by mass, even more preferably 0.01 to 0.2% by mass, and especially preferably 0.01 to 0.1% by mass. When the content of the amide compound (C) falls within the above range, the requirements of fuel saving performance, gear anti-seizing property, usefulness in high-temperature environments and anti-shudder performance can be readily satisfied simultaneously.

<Polyol Ester Compound (D)>

Examples of the polyol ester compound (D) include a reaction product of a polyol and a carboxylic acid compound. The polyol ester compound (D) may be a complete ester in which all the hydroxy groups of polyol have been esterified, or a partial ester in which a part of the hydroxy groups of polyol have remained without esterified, or a mixture of a complete ester and a partial ester; however, from the viewpoint of suppressing the acid number and improving anti-shudder performance, a complete ester is preferred.

The polyol is preferably an aliphatic polyol having 2 to 15 carbon atoms, and more preferably an aliphatic polyol having 2 to 8 carbon atoms.

Specific examples of the polyol include aliphatic diols such as ethylene glycol, propylene glycol, propanediol, butanediol, 2-methyl-1,3-propanediol, pentanediol, neopentyl glycol, hexanediol, 2-ethyl-2-methyl-1,3-propanediol, heptanediol, 2-methyl-2-propyl-1,3-propanediol, 2,2-diethyl-1,3-propanediol, octanediol, nonanediol, decanediol, undecanediol, dodecanediol, tridecanediol, tetradecanediol, and pentadecanediol; and tri or more aliphatic polyols such as trimethylolethane, ditrimethylolethane, trimethylolpropane, ditrimethylolpropane, glycerin, pentaerythritol, dipentaerythritol, tripentaerythritol, and sorbitol. Among these, from the viewpoint of attaining especially excellent anti-shudder performance, tri or more aliphatic polyols are preferred, and glycerin is more preferred.

The carboxylic acid compound is, for example, preferably a carboxylic acid having 12 to 24 carbon atoms, preferably 12 to 20 carbon atoms, more preferably 16 to 20 carbon atoms. The carboxylic acid compound may have a linear or branched configuration in the molecule, and may be any of a saturated or unsaturated one.

Typically, examples of such carboxylic acid compounds include saturated monocarboxylic acids such as lauric acid, tridecanoic acid, myristic acid, palmitic acid, margaric acid, stearic acid, isostearic acid, arachidic acid, behenic acid, and lignoceric acid; and unsaturated monocarboxylic acids such as myristoleic acid, palmitoleic acid, sapienic acid, oleic acid, linolic acid, linoleic acid, gadoleic acid, eicosenic acid, eicosadienic acid, erucic acid, and docosadienic acid.

Among these carboxylic acids, stearic acid, isostearic acid, oleic acid, linolic acid and linoleic acid are preferred, and stearic acid and oleic acid are more preferred.

The content of the polyol ester compound (D) based on the total amount of the composition is preferably 0.001 to 3% by mass, more preferably 0.01 to 2% by mass, even more preferably 0.03 to 1% by mass, and especially preferably 0.05 to 0.5% by mass. When the content of the polyol ester compound (D) falls within the above range, the requirements of fuel saving performance, gear anti-seizing property, usefulness in high-temperature environments and anti-shudder performance can be readily satisfied simultaneously.

In addition, the total content of the amide compound (C) and the polyol ester compound (D) is, from the viewpoint of anti-shudder performance, preferably 0.01 to 3% by mass, more preferably 0.03 to 2% by mass, more preferably 0.05 to 1% by mass, and especially preferably 0.05 to 0.5% by mass, based on the total amount of the composition.

<Other Additives>

The lubricating oil composition of the present embodiment may contain, within a range not detracting from the object of the present invention, any other additives than the mineral oil (A), the synthetic oil (B), the amide compound (C) and the polyol ester compound (D), and for example, any other additives such as a viscosity index improver, a friction modifier, an antioxidant, a dispersant, a pour point depressant, and an anti-foaming agent may be appropriately selected and added thereto. One of these additives may be used singly or plural kinds thereof may be used in combination. The lubricating oil composition of the present embodiment may contain the mineral oil (A), the synthetic oil (B), the amide compound (C) and the polyol ester compound (D), or may contain the mineral oil (A), the synthetic oil (B), the amide compound (C), the polyol ester compound (D) and any other additive.

Falling within a range not running contrary to the object of the present invention, the total content of these other additives is not specifically limited; however, in consideration of the effect of adding the other additives, the content is preferably 0.1 to 20% by mass based on the total amount of the composition, more preferably 1 to 15% by mass, even more preferably 5 to 13% by mass.

(Viscosity Index Improver)

The lubricating oil composition of the present embodiment may contain a viscosity index improver, for the purpose of improving the viscosity index of the base oil (A). Examples of the viscosity index improver include polymers such as a non-dispersant-type polymethacrylate, a dispersant-type polymethacrylate, an olefin-based copolymer (for example, an ethylene-propylene copolymer), and a dispersant-type olefin-based copolymer, a styrene-based copolymer (for example, a styrene-diene copolymer, and a styrene-isoprene copolymer).

The mass-average molecular weight (Mw) of the viscosity index improver may be suitably determined depending on the kind thereof, but is, from the viewpoint of viscosity characteristics, generally 500 to 1,000,000, preferably 5,000 to 800,000, more preferably 10,000 to 600,000.

In the case of a non-dispersant-type or dispersant-type polymethacrylate, Mw thereof is preferably 5,000 to 500,000, more preferably 10,000 to 300,000, and further more preferably 20,000 to 100,000. In the case of an olefin-based copolymer, Mw thereof is preferably 800 to 300,000, more preferably 10,000 to 200,000.

Here, the mass-average molecular weight can be measured by gel permeation chromatography (GPC) method and derived from the calibration curve drawn through using polystyrene. For example, the mass-average molecular weight of each polymer mentioned above may be calculated as a polystyrene-equivalent value thereof according to the GPC method mentioned below.

<GPC Measuring Apparatus>
Column: TOSO GMHHR—H(S)HT
Detector: RI detector for liquid chromatography, WATERS 150° C.
<Measurement Condition, Etc.>
Solvent: 1,2,4-trichlorobenzene
Measurement temperature: 145° C.
Flow rate: 1.0 ml/min
Sample concentration: 2.2 mg/ml
Injection amount: 160 μl
Calibration curve: Universal Calibration
Analysis program: HT-GPC (Ver. 1.0)

The content of the viscosity index improver is, from the viewpoint of viscosity characteristics, preferably 0.5 to 15% by mass based on the total amount of the composition, more preferably 1 to 10% by mass, even more preferably 1.5 to 8% by mass.

(Friction Modifier)

Examples of the friction modifier include ash-free friction modifiers such as fatty acid amines, fatty acid esters, fatty acid amides, fatty acids, aliphatic alcohols, fatty acid ethers and the like having at least one alkyl or alkenyl group having 6 to 30 carbon atoms, especially a linear alkyl or alkenyl group having 6 to 30 carbon atoms in the molecule; and molybdenum-based friction modifiers such as molybdenum dithiocarbamate (MoDTC), molybdenum dithiophosphate (MoDTP), and amine salts of molybdic acid.

In the case where an ash-free friction modifier is used, the content thereof is preferably 0.01 to 3% by mass based on the total amount of the composition, more preferably 0.1 to 2% by mass. In the case where a molybdenum-based friction modifier is used, the content thereof is, based on the total amount of the composition, preferably 60 to 1,000 ppm by mass in terms of molybdenum atom, more preferably 80 to 1,000 ppm by mass. When the content falls within the range, excellent fuel saving performance and anti-wear characteristics can be attained and detergency can be prevented from lowering.

(Antioxidant)

Examples of the antioxidant include amine-based antioxidants such as diphenylamine-based antioxidants, and naphthylamine-based antioxidants; phenol-based antioxidants such as monophenol-based antioxidants, diphenol-based antioxidants, and hindered phenol-based antioxidants; molybdenum-based antioxidants such as molybdenum amine complexes produced by reacting molybdenum trioxide and/or molybdic acid and an amine compound; sulfur-based antioxidants such as phenothiazine, dioctadecyl sulfide, dilauryl-3,3'-thiodipropionate, and 2-mercaptobenzimidazole; and phosphorus-based antioxidants such as triphenyl phosphite, diisopropylmonophenyl phosphite, and monobutylbiphenyl phosphite.

(Dispersant)

Examples of the dispersant include ash-free dispersants such as boron-free succinimides, boron-containing succinimides, benzylamines, boron-containing benzylamines, succinates, and amides of mono or dicarboxylic acids as typified by fatty acids or succinic acid.

(Pour Point Depressant)

Examples of the pour point depressant include ethylene-vinyl acetate copolymers, condensation products of chloroparaffin and naphthalene, condensation products of chloroparaffin and phenol, polymethacrylates, and polyalkylstyrenes.

(Anti-Foaming Agent)

Examples of the anti-foaming agent include silicone oils, fluorosilicone oils, and fluoroalkyl ethers.

(Various Physical Properties of Lubricating Oil Composition)

The kinematic viscosity at 100° C. of the lubricating oil composition of the present embodiment is preferably 2 to 5 mm$^2$/s, more preferably 2.25 to 4.75 mm$^2$/s, even more preferably 2.5 to 4.5 mm$^2$/s. The kinematic viscosity at 40° C. thereof is preferably 5 to 17 mm$^2$/s, more preferably 6 to 17 mm$^2$/s, even more preferably 8 to 17 mm$^2$/s.

The viscosity index is, from the viewpoint of exhibiting a stable effect in a broad temperature range, preferably 130 or more, more preferably 135 or more, even more preferably 140 or more.

The flash point of the lubricating oil composition of the present embodiment is preferably 184° C. or higher, more preferably 186° C. or higher, even more preferably 190° C. or higher.

As in the above, the lubricating oil composition of the present embodiment has a low viscosity and a high flash point, and therefore can be used in high-temperature environments while having fuel saving performance. In addition, the lubricating oil composition contains the amide compound (C) and the polyol ester compound (D), in addition to the mineral oil (A) and the synthetic oil (B) having specific properties, and therefore can satisfy all the requirements of fuel saving performance, gear anti-seizing property, usefulness in high temperate environments and anti-shudder performance, simultaneously.

Taking advantage of such characteristics, the lubricating oil composition of the present embodiment can be used, for example, as a lubricating oil composition for transmissions for gasoline vehicles, hybrid vehicles, electric vehicles, etc. In particular, since usefulness in high-temperature environments is excellent, it can be favorably used as a lubricating oil composition for hybrid vehicles and electric vehicles. Regarding other uses to which the lubricating oil composition of the present embodiment is applicable, preferred examples thereof include internal combustion engine oils, hydraulic fluids, turbine oils, compressor oils, lubricating oils for machine tools, cutting oils, gear oils, fluid bearing oil compositions, and ball bearing oils.

[Lubrication Method and Transmission]

The lubrication method of the present embodiment is a lubrication method using the lubricating oil composition of the present embodiment mentioned above. The lubricating oil composition to be used in the lubrication method of the present embodiment satisfies all the requirements of fuel saving performance, gear anti-seizing property, usefulness in high-temperature environments and anti-shudder performance, simultaneously. Accordingly, the lubrication method of the present embodiment is favorably used for transmissions for gasoline vehicles, hybrid vehicles, electric vehicles, etc. In particular, since usefulness in high-temperature environments is excellent, it can be favorably used as a lubrication method for, for example, transmissions for hybrid vehicles and electric vehicles. Regarding other uses, preferred examples include use for machines equipped with internal combustion engines, hydraulic machines, turbines, compressors, machine tools, cutting machines, gears, fluid bearings, ball bearings, etc.

The transmission of the present embodiment uses the lubricating oil composition of the present embodiment. The transmission of the present embodiment uses the lubricating oil composition that satisfies all the requirements of fuel saving performance, gear anti-seizing property, usefulness in high-temperature environments and anti-shudder performance, simultaneously, and is therefore favorably applied to various vehicles such as gasoline vehicles, hybrid vehicles, and electric vehicles. In particular, since usefulness in high-temperature environments is excellent, it can be favorably used as a transmission for hybrid vehicles and electric vehicles. Regarding other uses, preferred examples include use for machines equipped with internal combustion engines, hydraulic machines, turbines, compressors, machine tools, cutting machines, gears, fluid bearings, or ball bearings.

EXAMPLES

Next, the present invention is described in more detail with reference to Examples, but the present invention is not whatsoever limited by these Examples.

Examples 1 to 5, Comparative Examples 1 to 4

Lubricating oil compositions were prepared at the blending ratio (% by mass) shown in Table 1. The resultant lubricating oil compositions were tested in various test according to the methods mentioned below to evaluate the properties thereof. The evaluation results are shown in Table 1. The details of the components shown in Table 1, used in Examples, are as mentioned below. Mineral oil-1: paraffin-based mineral oil having kinematic viscosity at 40° C. of 9.5 mm$^2$/s, kinematic viscosity at 100° C. of 2.7 mm$^2$/s, viscosity index of 117, and flash point of 186° C.

Mineral oil-2: paraffin-based mineral oil having kinematic viscosity at 40° C. of 9.3 mm$^2$/s, kinematic viscosity at 100° C. of 2.6 mm$^2$/s, viscosity index of 112, and flash point of 186° C.

Mineral oil-3: paraffin-based mineral oil having kinematic viscosity at 40° C. of 9.9 mm$^2$/s, kinematic viscosity at 100° C. of 2.7 mm$^2$/s, viscosity index of 116, and flash point of 170° C.

Synthetic oil: ester oil having kinematic viscosity at 40° C. of 7.5 mm$^2$/s, kinematic viscosity at 100° C. of 2.5 mm$^2$/s, viscosity index of 197, and flash point of 206° C.

Amide compound: reaction product of isostearic acid and aliphatic polyamine (tetraethylenepentamine).

Polyol ester compound: mixture of oleic monoglyceride and oleic diglyceride.

Viscosity index improve 1: olefin-based copolymer

Viscosity index improve 2: polymethacrylate (number-average molecular weight: 50000).

Other additives: friction modifier, antioxidant, dispersant, pour point depressant, anti-foaming agent.

Measurement and evaluation of the lubricant oil compositions were carried out according to the following methods.

(1) Kinematic Viscosity

Kinematic viscosity at 40° C. and 100° C. was measured according to JIS K 2283:2000.

(2) Viscosity Index (VI)

Measured according to JIS K 2283:2000.

(3) Flash Point

Measured in a COC method according to JIS K2265-4: 2007.

(3) Evaluation of Gear Anti-Seizing Property

According to ASTM D5182-9 and using a FZG gear tester, each sample was tested under the condition of 90° C., 1500 rpm and 15 minutes, in which, as prescribed in relevant regulations, the load was stepwise increased and the load to have caused scoring in the gear tooth face is expressed as the stage of load. A higher stage of load means more excellent anti-seizing property.

(4) Evaluation of Anti-Shudder Performance

According to JASO M349:2012, each sample was tested under the condition mentioned below, and the numerical value of dμ/dV×1000 at a slip rate of 0.9 m/s was referred to as an index of anti-shudder performance. A larger numerical value means more excellent anti-shudder performance, and a negative numerical value means occurrence of shudder.

Friction material: cellulose disc/steel plate

Oil amount: 150 ml

Performance evaluation: After pre-conditioning interim operation, each sample was tested at an oil temperature 40° C. and 120° C. and at a slip rate of 0.9 m/s, and the μ·V friction characteristic (dV/dV0 in a sweep-down process of a rotation number of from 250 to 0 rpm under a face pressure of 1 MPa) was evaluated.

The pre-conditioning interim operation condition is as follows:

Oil temperature 80° C., face pressure 1 MPa, slip rate 0.6 m/s, test time of 30 minutes.

TABLE 1

| | | | Example | | | | | Comparative Example | | | |
|---|---|---|---|---|---|---|---|---|---|---|---|
| | | | 1 | 2 | 3 | 4 | 5 | 1 | 2 | 3 | 4 |
| (A) | Mineral Oil-1 | | 65.95 | 76.95 | 0 | 74.45 | 69.95 | 0 | 87.95 | 77.00 | 77.95 |
| | Mineral Oil-2 | | 0 | 0 | 76.95 | 0 | 0 | 0 | 0 | 0 | 0 |
| | Mineral Oil-3 | | 0 | 0 | 0 | 0 | 0 | 76.95 | 0 | 0 | 0 |
| (B) | Synthetic Oil | | 22.00 | 11.00 | 11.00 | 11.00 | 11.00 | 11.00 | 0 | 11.00 | 11.00 |
| (C) | Amide Compound | | 0.05 | 0.05 | 0.05 | 0.05 | 0.05 | 0.05 | 0.05 | 0 | 0.05 |
| (D) | Polyol Ester Compound | | 0.10 | 0.10 | 0.10 | 0.10 | 0.10 | 0.10 | 0.10 | 0.10 | 0 |
| Additives | Viscosity Index Improver 1 | | 0 | 0 | 0 | 2.50 | 0 | 0 | 0 | 0 | 0 |
| | Viscosity Index Improver 2 | | 0 | 0 | 0 | 0 | 7.00 | 0 | 0 | 0 | 0 |
| | Other Additives | | balance | balance | balance | balance | balance | balance | balance | balance | balance |
| | Total | | 100 | 100 | 100 | 100 | 100 | 100 | 100 | 100 | 100 |
| Properties | Kinematic Viscosity at 40° C. | mm²/s | 12.33 | 13.00 | 12.82 | 16.79 | 15.16 | 13.42 | 13.29 | 12.98 | 12.96 |
| | Kinematic Viscosity at 100° C. | mm²/s | 3.38 | 3.43 | 3.37 | 4.21 | 4.24 | 3.50 | 3.45 | 3.43 | 3.42 |
| | VI | | 157 | 146 | 142 | 165 | 206 | 145 | 142 | 146 | 146 |
| | Flash Point | ° C. | 204 | 196 | 194 | 196 | 196 | 180 | 186 | 196 | 196 |
| Effects | Gear Anti-seizing Property | | 11 | 11 | 11 | 11 | 11 | 11 | 10 | 11 | 11 |
| | Anti-Shudder Performance | dμ/dV × 10³ (40° C.) | 0.522 | 0.679 | 0.620 | 0.600 | 0.620 | 0.660 | 0.540 | 0.460 | −0.001 |
| | | dμ/dV × 10³ (120° C.) | 1.300 | 0.822 | 0.960 | 0.940 | 0.950 | 1.120 | 1.010 | −0.001 | 0.540 |

From the results in Table 1, it is confirmed that the lubricating oil compositions of Examples 1 to 5 have a low kinematic viscosity at 40° C. and a low kinematic viscosity at 100° C. and are therefore excellent in fuel saving performance, that the flash point thereof is 194° C. or higher and is high, and therefore they are also excellent in usefulness in high-temperature environments, and that they are also excellent in gear anti-seizing property and anti-shudder performance. On the other hand, the lubricating oil composition of Comparative Example 1 containing the mineral oil-3 having a low flash point of 170° C. has a low flash point, and therefore could not have a sufficient property in point of the usefulness in high-temperature conditions; the lubricating oil composition of Comparative Example 2 not containing the synthetic oil (B) has a low flash point and therefore could not have sufficient properties in point of usefulness in high-temperature environments and in point of gear anti-seizing property; the lubricating oil composition of Comparative Example 3 not containing the polyamide (C) and the lubricating oil composition of Comparative Example 4 not containing the polyol ester compound (D) could not have a sufficient property in point of anti-shudder performance, and accordingly, it is confirmed that these could not satisfy all the requirements fuel saving performance, usefulness in high-temperature environments, gear anti-seizing property and anti-shudder performance.

INDUSTRIAL APPLICABILITY

The lubricating oil composition of the present embodiment satisfies all the requirements of fuel saving performance, usefulness in high-temperature environments, gear anti-seizing property and anti-shudder performance, simultaneously. Accordingly, the lubricating oil composition of the present embodiment, and the lubrication method and the transmission using the lubricating oil composition are favorably used for transmissions for gasoline vehicles, hybrid vehicles, electric vehicles, etc. In particular, since usefulness in high-temperature environments is excellent, these are favorably used for transmissions for hybrid vehicles and electric vehicles.

The invention claimed is:

1. A lubricating oil composition, comprising, based on a total amount of the composition:
   (A) 50 to 90% by mass of a mineral oil (A) having a kinematic viscosity at 40° C. of 5 to 15 mm²/s and a flash point of 180° C. or higher;
   (B) 3 to 25% by mass of a synthetic oil (B) having a kinematic viscosity at 40° C. of 5 to 15 mm²/s and a flash point of 190° C. or higher;
   (C) 0.001 to 0.5% by mass of an amide compound (C), wherein the amide compound (C) is a reaction product of an aliphatic polyamine compound having 6 to 12 carbon atoms and a carboxylic acid compound having 12 to 24 carbon atoms; and
   (D) 0.001 to 2% by mass of a polyol ester compound (D), wherein the polyol ester compound (D) is a reaction product of an aliphatic polyol having 2 to 8 carbon atoms and a carboxylic acid compound having 12 to 24 carbon atoms,
   wherein a total content of (C) and (D) is 0.01 to 3% by mass,
   wherein the lubricating oil composition has a flash point of 184° C. or higher.

2. The lubricating oil composition according to claim 1, wherein the lubricating oil composition has a kinematic viscosity at 100° C. of 2 to 5 mm²/s.

3. The lubricating oil composition according to claim 1, wherein the lubricating oil composition has a kinematic viscosity at 40° C. of 5 to 17 mm²/s.

4. The lubricating oil composition according to claim 1, which is adapted to function as a lubricating oil composition for transmissions.

5. The lubricating oil composition according to claim 1, which is adapted to function as a lubricating oil composition for electric vehicles or hybrid vehicles.

6. A lubrication method, comprising lubricating an article with the lubricating oil composition of claim 1.

7. The lubrication method according to claim 6, wherein the article is a transmission.

8. A transmission, comprising the lubricating oil composition of claim 1.

9. The lubricating oil composition according to claim 1, wherein the composition does not contain a phosphate ester.

10. The lubricating oil composition according to claim 1, wherein:
the mineral oil (A) is a paraffinic-based mineral oil having a kinematic viscosity at 40° C. of 8.5 to 11 mm$^2$/s and a flash point of 182° C. or higher;
the synthetic oil (B) is an ester oil having a kinematic viscosity at 40° C. of 5 to 10 mm$^2$/s and a flash point of 200° C. or higher;
a content of the synthetic oil (B) is 10 to 25% by mass relative to a total mass of the lubricating oil composition;
a content of the amide compound (C) is 0.01 to 0.1% by mass relative to the total mass of the lubricating oil composition;
the polyol ester compound (D) comprises a mixture of a complete ester and a partial ester; and
a total content of the polyol ester compound (D) is 0.05 to 0.5% by mass relative to the total mass of the lubricating oil composition.

11. The lubricating oil composition according to claim 10, wherein the polyol ester compound (D) comprises a reaction product of an aliphatic polyol selected from the group consisting of trimethylolethane, ditrimethylolethane, trimethylolpropane, ditrimethylolpropane, glycerin, pentaerythritol, dipentaerythritol, tripentaerythritol, and sorbitol, with a carboxylic acid compound selected from the group consisting of stearic acid, isostearic acid, oleic acid, linolic acid and linoleic acid.

* * * * *